United States Patent

Cranage

[15] 3,643,985
[45] Feb. 22, 1972

[54] LATCHING DEVICE FOR COUPLING ASSEMBLY

[72] Inventor: Bidwell C. Cranage, Ferguson, Mo.
[73] Assignee: Stile-Craft Manufacturers, Inc., St. Louis, Mo.
[22] Filed: Dec. 4, 1969
[21] Appl. No.: 882,211

[52] U.S. Cl. ............................................. 285/189, 285/317
[51] Int. Cl. ........................................................ F16l 41/00
[58] Field of Search ............... 285/317, 24, 325, 39, 27, 189, 285/7; 137/614.06, 614.05; 251/149.9

[56] References Cited

UNITED STATES PATENTS

| 218,723 | 8/1879 | Faust | 285/325 X |
| 831,429 | 9/1906 | Harrington | 285/325 X |
| 1,363,963 | 12/1920 | Fitzpatrick | 285/317 |
| 2,771,308 | 11/1956 | Vitcha et al | 285/317 X |
| 2,908,511 | 10/1959 | Rogers | 285/317 X |
| 3,448,760 | 6/1969 | Cranage | 137/614.05 X |

FOREIGN PATENTS OR APPLICATIONS 1,487,324   5/1967   France........................251/149.9

Primary Examiner—Thomas F. Callaghan
Attorney—Cohn and Powell

[57] ABSTRACT

This latching device is used to couple connectable members together, one of which includes an adapter assembly having a valve plug, and the other of which includes a valve assembly having a valve plug receiving body. The adapter assembly includes an offset latch plug, and the valve assembly includes a latching unit engageable with the latch plug. The latching unit includes a slotted bracket member and an independent latch frame member capable of guided movement within the slots. A tension spring between these two members tends to pull them together. The latch plug includes a cammed nose portion and a transverse latch slot. The latch frame includes a cammed lip deflected by cam action and received into the latch slot to provide the latched condition. Unlatching is effectuated by depressing the latch frame.

8 Claims, 7 Drawing Figures

PATENTED FEB 22 1972

INVENTOR
BIDWELL C. CRANAGE

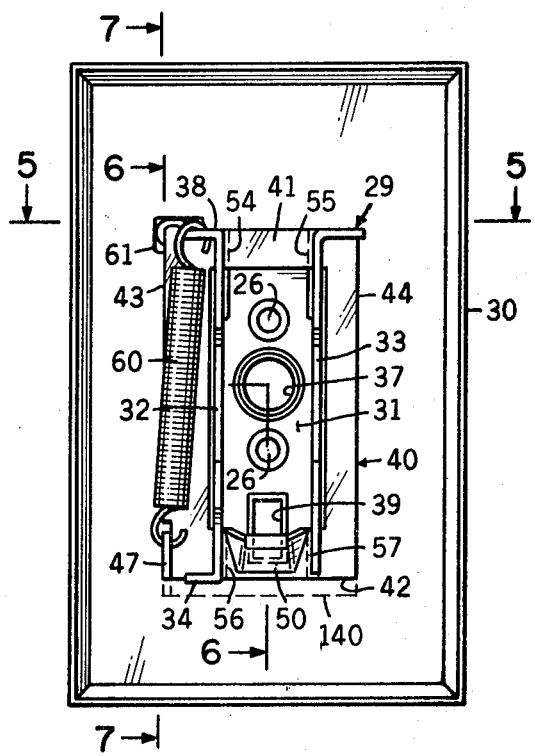
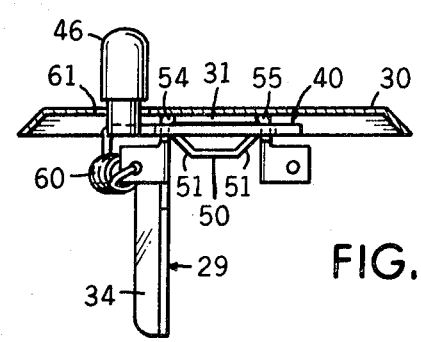
FIG. 5
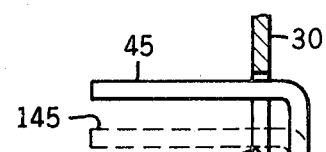
FIG. 6
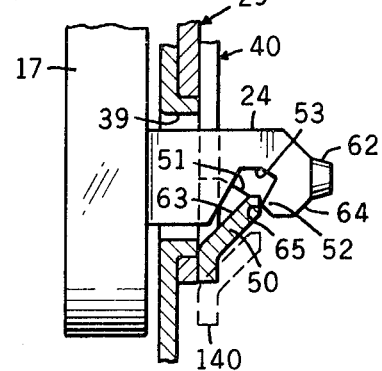
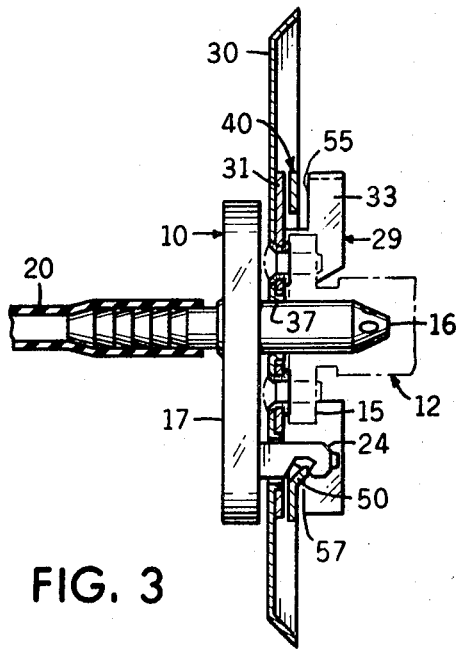
FIG. 3
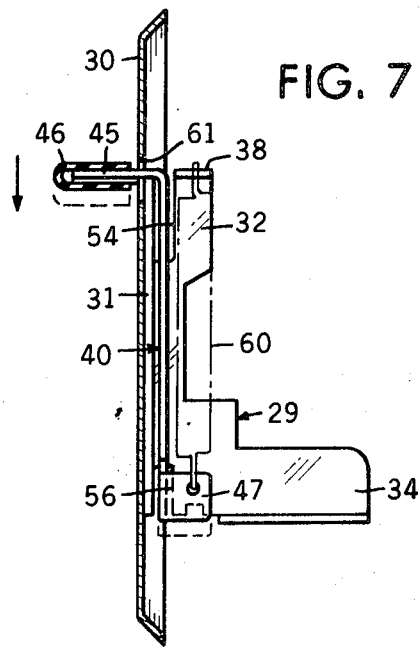
FIG. 7

LATCHING DEVICE FOR COUPLING ASSEMBLY

BACKGROUND OF THE INVENTION

This invention relates to a latching device, and in particular, a latching device for use with a coupling assembly to preclude the inadvertent release of connected parts. An important, indeed critical, feature of any coupling assembly is the mechanism used to hold the parts together, and this is particularly true when the coupled parts are under pressure. In the past, in many instances, some sort of threaded connection has been used, but these have proved unsatisfactory for several reasons. Threaded connections do not provide the necessary quick disconnection of the coupled parts, which is not only convenient but which may also be vitally necessary in an emergency situation and further, threaded connections provide a potential leakage source for the fluid.

There are also in the prior art snap mechanisms which are built concentrically, as it were, into the coupling assembly. This type of latching mechanism tends to be complex because of the sealing problem and because the arrangement of parts is such that connection and disconnection are not easily accomplished by one-handed operation.

In the known latching mechanisms which are independent of the coupling action to the extent that the point of latching action is spaced from the supply line itself, a direct latch action is not used. On the contrary, a hinged latch arm is utilized which requires a rotary as opposed to a direct unlatching action.

SUMMARY OF THE INVENTION

This latching device obviates the necessity for a threaded coupling connection between oxygen supply lines and the like used in hospitals and industry. The connection and disconnection may be made exceedingly rapidly and sealing problems are minimized because the latching mechanism is independent and offset from the supply line axis. Further, the latching and unlatching action is direct, rather than rotary, and this facilitates the disconnection operation considerably. The operator simply depresses the latch handle transversely to the axis of the line and withdraws and adapter. Thus, the latching mechanism is easy to operate. It is free of complexity, and is relatively inexpensive to manufacture.

The latching device provides a means of locking a pair of coupling members together in latched relation, one of the coupling members including a first latch member and the other having a cooperating latching unit mounted thereto.

The latching unit includes a support means, and a second latch member is mounted to the support means in slidable relation. Guide means is provided between the second latch member and the support means. Each of the latch members includes a latch-engaging portion and resilient means between the support means and the second latch member maintains the latch members in a latched condition.

The first latch member includes a latch plug having a slot, and the second latch member includes a lip received by the slot in the latched condition. The latch plug includes a first cam face remotely disposed of the slot and the lip includes a second cam face. Engagement of the cam faces actuates the latch member into a latched condition.

The second latch member is provided by a latch frame disposed in embracing relation about the coupling axis of the coupling assembly. The support means includes a bracket member having opposed side flange portions and the latch frame member includes upper and lower cross portions. One of said latch frame and bracket members includes a plurality of slots transversely disposed relative to the coupling axis to receive the other of said members in guided, retained relation.

The lower cross portion of the latch frame includes an inclined lip having a first cam face and the latch plug includes a second cam face. Engagement of the cam faces depresses the frame member on contact and continued engagement and forward movement conditions the frame member for being received into the latch plug slot. Spring action urged the lip into the slot to provide a latched condition.

The support includes a cover plate overfitting the latching unit and the latch member includes a transverse handle projecting outwardly of an opening in the cover. The latch member and the bracket member each include associated tabs disposed in spaced relation from each other and the resilient means is provided by a tension spring extending between said tabs. The side flanges assist in guiding the latch frame member by precluding substantial relative side movement.

BRIEF DESCRIPTION OF THE DRAWING

FIG. 3 is a cross-sectional view taken on line 3—3 of FIG. 1 illustrating the latched condition;

FIG. 4 is an elevational view on the rear face of the cover plate illustrating the latching unit;

FIG. 5 is a cross-sectional plan view taken on line 5—5 of FIG. 4;

FIG. 6 is an enlarged fragmentary detail of the latching members as taken on line 6—6 of FIG. 4, and FIG. 7 is a cross-sectional view of the latching unit taken on line 7—7 of FIG. 4.

DESCRIPTION OF THE PREFERRED EMBODIMENT

Figures 1, 2:
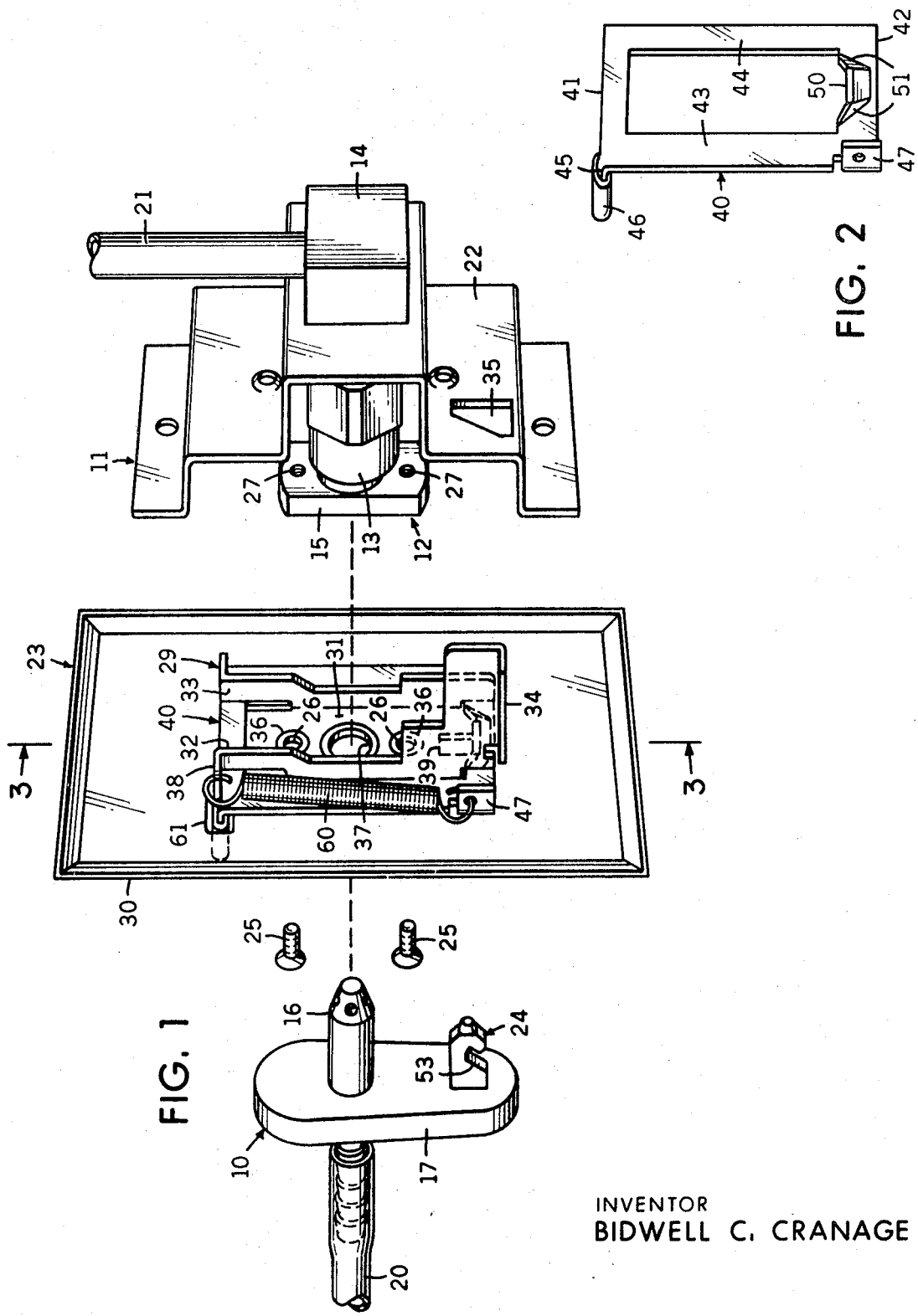
FIG. 1 is a perspective view of the coupling assembly, partly exploded.
FIG. 2 is a perspective view of the latch frame member only.

Referring now by characters of reference to the drawing, and first to FIG. 1, it will be understood that the coupling assembly shown includes a hose adapter assembly 10 which is connectable to a valve assembly station, generally indicated by numeral 11. The valve assembly 11 includes a valve body 12 having threadedly interconnected forward and rearward portions 13 and 14 respectively. The forward portion 13 of the valve body 12 includes a socketed head portion 15, the socketed portion (not shown) having a configuration suitable for receiving a tubular valve plug 16 which projects from the heat portion 17 of the adapter 10. The adapter assembly 10 and the valve assembly 11 constitute connectable members.

The valve assembly 11 provides a station for a fluid which is supplied to the station by a hose 20 through the medium of the valve plug 16. A supply pipe 21, connected to the valve assembly 11, supplies one or more facilities with the fluid. The valve assembly 11 is intended to be wall mounted, and to facilitate such mounting, includes a stepped bracket 22. In order to provide a secure connection between the adapter and valve assemblies 10 and 11 respectively, the valve assembly 11 is provided with a latching unit, generally shown by numeral 23 which cooperates with an offset latch plug 24 on the adapter assembly 10. The latching unit 23 is attached to the socketed head portion 15 of the valve body 12 by means of a pair of fasteners 25 which pass through apertures 26 provided in the latching unit 23 to threadedly engage compatibly threaded apertures 27 provided in the socketed head portion 15.

A cover plate 30 effectively conceals the valve body 12 when the valve assembly 11 is wall mounted, and the cover plate 30 thereby forms part of the latching unit 23. The latching unit 23 also includes a bracket member which constitutes a support means and is generally shown by numeral 29. The bracket member 29 includes a front portion 31 and a pair of opposing integral side flanges 32 and 33 constituting sideplate portions. The side flange 32 is formed into an elongate key 34 at its lower end which is received by a matching key-receiving aperture 35 provided in the stepped bracket 22. The key 34 provides a locating device to insure that the correct cover, which has a specific designation such as oxygen, will be suitably matched to an oxygen station. The front portion 31 of the bracket member 29 is permanently attached to the cover plate 30 by means of hollow rivets 36 which provide apertures 26. The latching unit 23 also includes an aperture 37 which receives the tubular valve plug 16. As shown in FIG. 3, the material of the cover plate 30 is preferably deformed to frame this aperture 37.

The latching unit includes a latch frame member 40 which is disposed in embracing relation about the valve body 12 relative to the coupling axis of the coaxially coupled adapter assembly 10 and valve assembly 11. This latch frame member 40 is illustrated in FIG. 2, where it can be seen to include upper and lower cross portions 41 and 42, having side portions 43 and 44 extending therebetween. The upper cross portion 41 includes an outwardly projecting tab 45 having a cover 46 of plastic or other suitable material, the covered tab 45 providing a handle for the latch frame member 40. The lower cross portion 42 includes an outwardly projecting tab 47, the purpose of which will become clear later, and an inclined lip 50, having side portions 51, which provide a latch catch. The lip 50 is engageable by a shoulder 52 disposed on the margin of a slot 53 provided in the latch plug 24, this arrangement being illustrated in large detail in FIG. 6.

As shown in FIGS. 3 and 4 particularly, the bracket member 29 includes opposed upper slots 54 and 55 and opposed lower slots 56 and 57, and slots being disposed at the junction of the side flanges 32 and 33 and the bight or front portion 31 of the bracket member 29. These upper slots 54 and 55 and lower slots 56 and 57 accommodate associate upper and lower cross portions 41 and 42 of the latch frame member 40 and provide a guide means receiving the latch frame member 40 in slidable relation. The latch frame member 40 is thereby permitted to move vertically to a limited extent relative to the bracket member 29, and yet the frame member 40 is effectively retained on the valve assembly member 11. Further, the side portions 43 and 44 of the latch frame member 40 are adjacently disposed of the bracket member flanges 32 and 33, which effectively precludes sideways movement of the latch frame member 40.

A tension spring 60, constituting a resilient means, is interconnected between a tab 38, provided on the side flange 32 of the bracket member 29, and the tab 47 provided on the latch frame member 40, as by hooking through holes provided on said associated tabs 38 and 47. The tension spring 60 is of such a length that the latch member 40 is urged in an upward direction by the spring 60.

The latch frame member 40 (FIG. 6) may be moved downwardly under the action of the latch plug 24 when the plug 24 is received in the opening 39 and the nose 62 of the latch plug 24 is urged forwardly. This movement results in the cam face 64 provided on the latch plug 24, engaging the cam face 63 of the inclined lip 50. The cam faces on the latch plug and the lip respectively constitute first and second cam faces. Of course, the interfitting nature of the tubular valve plug 16, which is slidably received within the socket head portion 15 of the valve assembly 11, precludes relative vertical movement of the latch plug 24 during this operation. When the latch plug 24 is inserted a sufficient amount beyond the front face 65 of the inclined lip 50, the inclined lip 50 moves upwardly under spring action into the slot 53. Inadvertent withdrawal of the adapter assembly 10 is precluded by the engagement of the shoulder 52, provided by the margin of the slot 53, against the front face 65 of the inclined lip 50. The inclined lip 50 and the slot 53 constitute, in effect, first and second latch engagement portions latching the coupled members.

The rating of the spring 60 is sufficiently small to permit the latch frame member 40 to be moved downwardly by digitally depressing the handle 45, which projects through an opening 61 provided in the cover plate 30.

It is thought that the functional advantages and structural features of this latching device have become fully apparent from the foregoing description of parts, but for completeness of disclosure, the operation of the device will be briefly summarized.

The valve assembly 11 is wall mounted by means of the stepped plate 22. When thus mounted, the socketed head portion 15 is threadedly adjusted axially, so that when the cover 30 is positioned against the wall (not shown) the bracket 29 of the latching unit 23 will abut the socket head portion 15. The fasteners 25 may then be inserted through apertures 26 to secure the latching unit 23 in place. In order to interconnect the supply line to the station, the adapter assembly 10 is grasped by an operator, and the tubular valve plug 16 is inserted into the opening 37 in the cover plate 30. As the valve plug 16 is being received by the socket head portion 15, the latch plug 24 enters the opening 39. Upon continued forward movement of the latch plug 24 through the opening 39, the cam face 64, provided by the underside of the latch plug 24, engages the cam face 63 of the latch frame member 40. Wedge action resulting from the engagement of the cam faces 64 and 63 provides a vertical component of the forward force applied to the plug 24 and said component urges the latch frame member 40 downwardly. As the inclined lip 50 rides along the cam underside of the latch plug 24, it follows the contour thereof and ultimately conditions the lip 50 to move upwardly into the slot 53. At this stage, the shoulder 52, which constitutes a bearing edge, is engageable with the inclined lip front face 65, which constitutes a bearing face, and the adapter assembly 10 is securely latched in position. When the coupling of parts has been effectuated, spring action with the socketed head portion 15, such as indicated in U.S. Pat. No. 2,908,511, tends to urge the adapter assembly outwardly. This tendency results in the shoulder 52 bearing firmly upon the inclined lip front face 65 and enhances the latching action.

Disconnection of the adapter assembly 10 may be accomplished with one hand. The operator simply depresses the handle 45 (FIG. 6) to a location indicated in broken outline by numeral 145 while grasping the adapter assembly 10. This action urges the latch frame member 40 and the inclined lip 50 downwardly into the position indicated in broken outline by numeral 140, and spring action within the socketed head portion urges the latch rearwardly and out of latched engagement. When the latch frame member 40 is in this unlatched condition, the adapter assembly 10 may be easily withdrawn.

It will be understood that during both the connect and disconnect actions, the latch frame member 40 is retained in place on the bracket member 29 by slots 54 through 57 in which it rides freely. These slots effectively provide a guide means insuring that the latch frame member 40 moves transversely relative to the coupling axis. In addition, the slots 54 through 57 act to retain the latch frame member 40 and prevent forward movement thereof as the latch plug 24 is urged against the lip 50. The latch frame member 40 is disposed in embracing relation about the coupling axis and about the bracket member 29. In the preferred embodiment, this arrangement results in the side flange portions 32 and 33 of the bracket member 29, which are adjacently disposed relative to the side portions 43 and 44, precluding side movement of the latch frame member 40. In effect, this arrangement facilitates the guiding action and provides part of the guide means for the latch frame member 40.

I claim as my invention:

1. A latching device for a coupling assembly or the like, comprising:
   a. adapter means including a latch plug having a first shoulder means,
   b. support means,
   c. a latch catch member including a second shoulder means engageable by the first shoulder means,
   d. guide means between the latch catch member and the support means guiding the latch catch member in slidable relation to the support means,
   e. resilient means between the support means and latch catch member urging the latch catch member into a latched condition with the latch plug,
   f. the support means including a bracket having a flange portion,
   g. the latch catch member including a cross portion, and
   h. one of said portions being slotted to receive the other of said portions in slidable relation and provide the guide means.

2. A latching device as defined in claim 1, in which:

i. the bracket flange portion including spaced upper and lower slots disposed in transverse alignment to the latch plug, and j. the latch catch member including opposed upper and lower spaced cross portions receivable by associated slots of the bracket flange portion whereby to provide the guide means.

3. A latching device for a coupling assembly or the like, comprising:

a. adapter means including a first coupling means having a coupling axis and a latch plug disposed in offset relation from the coupling axis, the latch plug having a first engagement portion, b. a second coupling means having a coupling axis, one of said coupling means coaxially receiving the other coupling means, c. support means mounted to the second coupling means, d. a latch frame means slidably mounted to the support means and having its periphery disposed in embracing relation about the coupling axis, the latch frame means including:

1. a second latch engagement portion, engageable by the first latch engagement portion in a latched condition, e. guide means between the support means and the latch frame means, and f. resilient means between the support means and the latch frame means tending to lock the latch engagement portion into the latched condition.

4. A latching device for a coupling assembly or the like, comprising:

a. adapter means including a first coupling means having a coupling axis and a latch plug disposed in offset relation from the coupling axis, the latch plug having a first engagement portion, b. a second coupling means having a coupling axis, one of said coupling means coaxially receiving the other coupling means, c. support means mounted to the second coupling means, d. a latch frame means slidably mounted to the support means and disposed in embracing relation about the coupling axis, the latch frame means including:

1. a second latch engagement portion, engageable by the first latch engagement portion in a latched condition, e. guide means between the support means and the latch frame means, f. resilient means between the support means and the latch frame means tending to lock the latch engagement portion into the latched condition, g. the support means including a bracket member having opposed sideplate portions disposed in spaced relation, and h. the latch frame means including a latch frame member having upper and lower cross plate portions disposed in spaced relation, the plate portions of one of said bracket and latch frame members including a plurality of slots receiving the plate portions of the other of said members in guided, retained relation.

5. A latching device for a coupling assembly or the like, comprising:

a. adapter means including a first coupling means having a coupling axis and a latch plug disposed in offset relation from the coupling axis, the latch plug having a first engagement portion, b. a second coupling means having a coupling axis, one of said coupling means coaxially receiving the other coupling means, c. support means mounted to the second coupling means, d. a latch frame means slidably mounted to the support means and disposed in embracing relation about the coupling axis, the latch frame means including:

1. a second latch engagement portion, engageable by the first latch engagement portion in a latched condition, e. guide means between the support means and the latched frame means, f. resilient means between the support means and the latch frame means tending to lock the latch engagement portion into the latched condition, g. the latch frame means including a latch frame having upper and lower cross portions, h. the support means including a bracket member having upper and lower slots receiving associated cross frame portions, and i. the slots being transversely disposed relative to the coupling axis.

6. A latching device as defined in claim 5, in which:

j. the lower cross portion includes an inclined lip having a first cam face, k. the latch plug includes a slot and a second cam face disposed remotely of the slot, the second cam face engaging the first cam face to condition the slot to receive the lip.

7. A latching device as defined in claim 6, in which:

l. the support includes a cover plate attached to the bracket, the cover plate having an opening, m. the latch frame member includes a transverse handle means, received by the opening, and a tab, n. the bracket member includes an associated tab disposed in spaced relation from the tab of the latch frame means, and o. the resilient means includes a tension spring extending between associated tabs.

8. A latching device for a coupling assembly or the like, comprising:

a. adapter means including a first coupling means having a coupling axis and a latch plug disposed in offset relation from the coupling axis, the latch plug having a first engagement portion, b. a second coupling means having a coupling axis, one of said coupling means coaxially receiving the other coupling means, c. support means mounted to the second coupling means, d. a latch frame means slidably mounted to the support means and disposed in embracing relation about the coupling axis, the latch frame means including:

1. a second latch engagement portion, engageable by the first latch engagement portion in a latched condition, e. guide means between the support means and the latch frame means, f. resilient means between the support means and the latch frame means tending to lock the latch engagement portion into the latched condition, g. the support means including a bracket member having opposed side portions, h. the latch frame means including a latch frame member having upper and lower cross portions and opposed side portions extending therebetween, and i. the side portions of the latch frame member being adjacently disposed relative to associated side portions of the bracket member, the side portions of the bracket member providing at least part of the guide means.

* * * * *